(12) United States Patent
Miyajima et al.

(10) Patent No.: US 6,526,323 B1
(45) Date of Patent: Feb. 25, 2003

(54) DECENTRALIZED SUPERVISORY CONTROL SYSTEM

(75) Inventors: Yasuyuki Miyajima, Fuchu (JP); Yukihiko Tomizawa, Toda (JP); Yoshihiro Ito, Kawasaki (JP); Tsuyoshi Kaneko, Hachioji (JP); Akira Hirahara, Tama (JP); Hiroshi Nakatani, Yokohama (JP); Takatoshi Kato, Chigasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/573,944

(22) Filed: May 19, 2000

(30) Foreign Application Priority Data

May 19, 1999 (JP) ............................................. 11-138881

(51) Int. Cl.[7] .............................................. G05B 15/02
(52) U.S. Cl. ............................................. 700/9; 700/19
(58) Field of Search ................................ 700/9, 19–20

(56) References Cited

U.S. PATENT DOCUMENTS

| | | | | |
|---|---|---|---|---|
| 4,742,445 A | * | 5/1988 | Watanabe | ................ 700/83 |
| 4,933,885 A | * | 6/1990 | Kato et al. | ................ 700/286 |
| 5,146,401 A | * | 9/1992 | Bansal et al. | ................ 700/9 |
| 6,088,624 A | * | 7/2000 | Khan et al. | ................ 700/86 |
| 6,327,510 B1 | * | 12/2001 | Yoshida et al. | ................ 700/9 |

FOREIGN PATENT DOCUMENTS

| | | |
|---|---|---|
| JP | 7-284181 | 10/1995 |
| JP | 10-333940 | 12/1998 |

* cited by examiner

*Primary Examiner*—Thomas Black
*Assistant Examiner*—Ronald D Hartman, Jr.
(74) *Attorney, Agent, or Firm*—Oblon, Spivak, McClelland, Maier & Neustadt, P.C.

(57) ABSTRACT

A distributed control device in a decentralized supervisory control system comprises an I/O interface, a data storage section for storing PIO data from a controller and additional information such as data obtention time, a time obtention section for adding a time to the data when the data is stored in the data storage section, a data distribution section for distributing the PIO data and other supervisory information, a supervisory control section for carrying out supervisory control using the PIO data from the controller, a network interface for communicating with other distributed control devices and the supervisory device, and a communication section for connecting this distributed control device to the other distributed control devices and the supervisory device.

23 Claims, 18 Drawing Sheets

DECENTRALIZED SUPERVISORY CONTROL SYSTEM

CROSS-REFERENCE TO RELATED APPLICATION

This application is based upon and claims the benefit of priority from the prior Japanese Patent Application No. 11-138881, filed May 19, 1999, the entire contents of which are incorporated herein by reference.

BACKGROUND OF THE INVENTION

The present invention relates to a supervisory control system for municipal infrastructures, for example, supervisory control of widely distributive processes for, for example, water, gas, and power supplies and environment measurements, and in particular, to a decentralized supervisory control system comprising one or more supervisory devices interconnected with one or more distributed control devices.

In conventional wide-area supervisory control systems, supervisory control is provided by concentrating information from distributed controllers and sensors at a supervisory device installed in a central supervisory room. Thus, a network-based decentralized supervisory control system must be applied so as to easily collect requests for load distributions and sensor information scattered over a wide area and to use various communication means to distribute the data to the center.

An example of a conventional decentralized supervisory control system is shown in FIG. 1. As shown in this figure, the decentralized supervisory control system comprises, for example, a plurality of distributed control devices 3 each connecting to a controller 1 for valves in water lines and to a sensor 2, generally one supervisory device 4, and a communication path 5 connecting the distributed control devices 3 and the supervisory devices 4.

The distributed control device 3 receives PIO data and sensor information from the controller 1 and the sensor 2, respectively, and sends out these data to the supervisory device 4 via the communication path 5. The supervisory device 4 comprises an antenna 4 for receiving time signals, a display 4b, a time setter (TS) 4c, a database (DB) 4d, and a image processor (IP) so that the timer setter (TS) 4c can add to data from each distributed control device 3 the time at which the data was obtained (a time stamp) and so that the database (DB) 4d and the image processor (IP) 4e can process the data into images in a predetermined form for display on the display 4b.

FIG. 2 shows an example of how the distributed control device 3 is installed in a decentralized supervisory control system applied to a water line plant.

A water line 11 buried under a roadway 10 has valve 12, a controller 1 including an actuator or controlling opening and closing of the valve 12, and a sensor 2 for measuring flow rate and pressure. The valve 12, the controller 1, and the sensor 2 are placed in a 13 that is occluded by a cover 14. In addition, a sidewalk 15 at a side of the roadway 10 has a road station enclosure 16 installed thereon and having the distributed control device 3 installed therein. The road station enclosure 16 and the manhole 13 are connected together through a wiring duct 17, with signal wiring 18 and power supply wiring 19 accommodated in the wiring duct 17 to electrically connect the distributed control device 3 to the controller 1 and sensor 2. Additionally, the distributed control device 3 has communication wiring 20 drawn therein and connected to the communication path 5 and also has power supply wiring 21 drawn therein.

On the other hand, a data structure used by the supervisory device 4 will be explained with reference to FIG. 3. The time at which such data was obtained (a time stamp) is conventionally added to the data as an attribute of the process data. Illustrated data 212 includes one data 212e and time data 212a to 212d accompanying the data 212e. The time data comprises data 212a indicating year, month, and day, data 212b indicating hour, minute, and second, data 212c indicating millisecond, microsecond, and nanosecond, and data 212d indicating a data type.

In this manner, the data structure has detailed data such as year, month, day, hour, minute, second, millisecond, and microsecond added to the one data. The detailed time stamp data are effective in determining the order of individual data, but they are excessively detailed as man-machine supervisory data. Furthermore, when the local distributed control device carries out a transmission to the central supervisory device via the communication path, that is, when 32-bit data is transmitted, a triple amount of data, that is, 32×3-bit time data is added before the transmission, thereby increasing transmission loads.

In addition, since the distributed control device generally has its own supervisory section, this supervisory section is often managed and maintained online. In this case, an exclusive maintenance terminal is connected to the device to make adjustments such as changes in the organization of screens and Io settings. Since, however, a supervisory control section, a date distribution section, and the like are operating continuously, screens or data may be distributed to the central supervisory device before screen updating or independent debugging is completed, resulting in transmission of incorrect data.

Additionally, if a public line is used as the communication path, it is important in terms of security to provide means for preventing incorrect telephone numbers, intended leakage of supervisory data, and invalid accesses.

BRIEF SUMMARY OF THE INVENTION

It is an object of the present invention to provide a decentralized supervisory control system that can prevent errors such as transmission of incorrect data between a distributed control device and a supervisory device even if a screen is changed for supervision.

To attain this object, according to the present invention, a distributed control device connected to a central supervisory device via communication path comprises an I/O interface for transmitting control signals to a controller for a controlled device and obtaining inputs from a sensor, data storage means for storing PIO data from the controller, sensor information, and additional information such as data obtention time, time obtention means for adding a time to the data when the data is stored in the data storage means, data distribution means for distributing the PIO data, the sensor information, and other supervisory information, supervisory control means for carrying out supervisory control using the PIO data from the controller as well as the sensor information, a network interface for communicating with other distributed control devices and the supervisory device, and communication means for connecting the distributed control device to the other distributed control devices and supervisory device. The distributed control device is also characterized by comprising means for inputting information for use in supervising a plant, means for accumulating the information, means for sending out the information from the information accumulation means to the supervisory device via the communication path, means for processing the input or the accumulated information into information that is sensed by an operator and presenting this information to the supervisory device via the communication path, means for controlling the plant in accordance with the operator's commands obtained from the supervisory device via the communication path, and means for outputting signals to the plant in response to the operator's commands, wherein:

the supervisory device comprises means for converting the information obtained from the distributed control device via the communication path and used to supervise and control the plant, into information that is sensed by the operator, and presenting the converted information to the operator, and means for replacing the operator's commands with signals and communicating the replaced signals to the supervisory device via the communication path.

With these means, each distributed control device adds a time stamp to the PIO data and sensor information, processes the obtained data into the information that is sensed by the operator, and sends this information to the supervisory device, which simply displays the processed data. Therefore, data to be supervised by the operator is created by the distributed control device instead of the supervisory device, preventing errors in transmissions of the supervised data as caused by other processing such as changes in a screen.

Additional objects and advantages of the invention will be set forth in the description which follows, and in part will be obvious from the description, or may be learned by the practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of a decentralized supervisory control system according to the present invention will be described below with reference to the drawings.

(First Embodiment)

Figure 4:
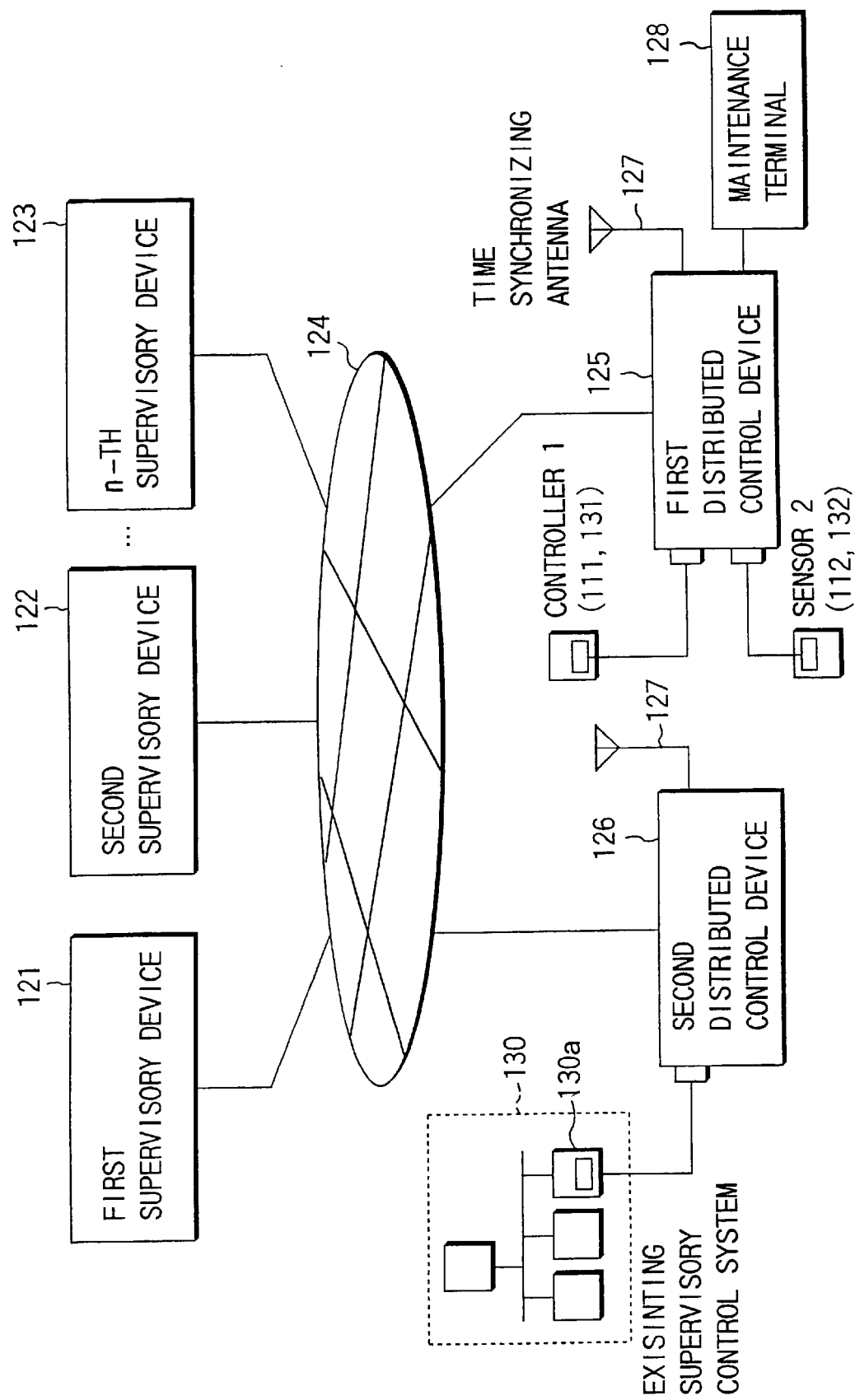
FIG. 4 is a diagram showing the entirety of a decentralized supervisory control system according to the present invention.

FIG. 4 is a general configuration diagram of a system according to this embodiment. In this figure, a first supervisory device 121, a second supervisor device 122, . . . , an n-th supervisory device 123 as well as a first distributed control device 125 and a second distributed control device 126 are connected together via a communication path 124 such as a public line. The distributed control devices 125, 126 each include a time synchronizing antenna 127, and the second distributed control device 126 is connected to a distributed control device 130a of an existing supervisory control system.

Figure 5:
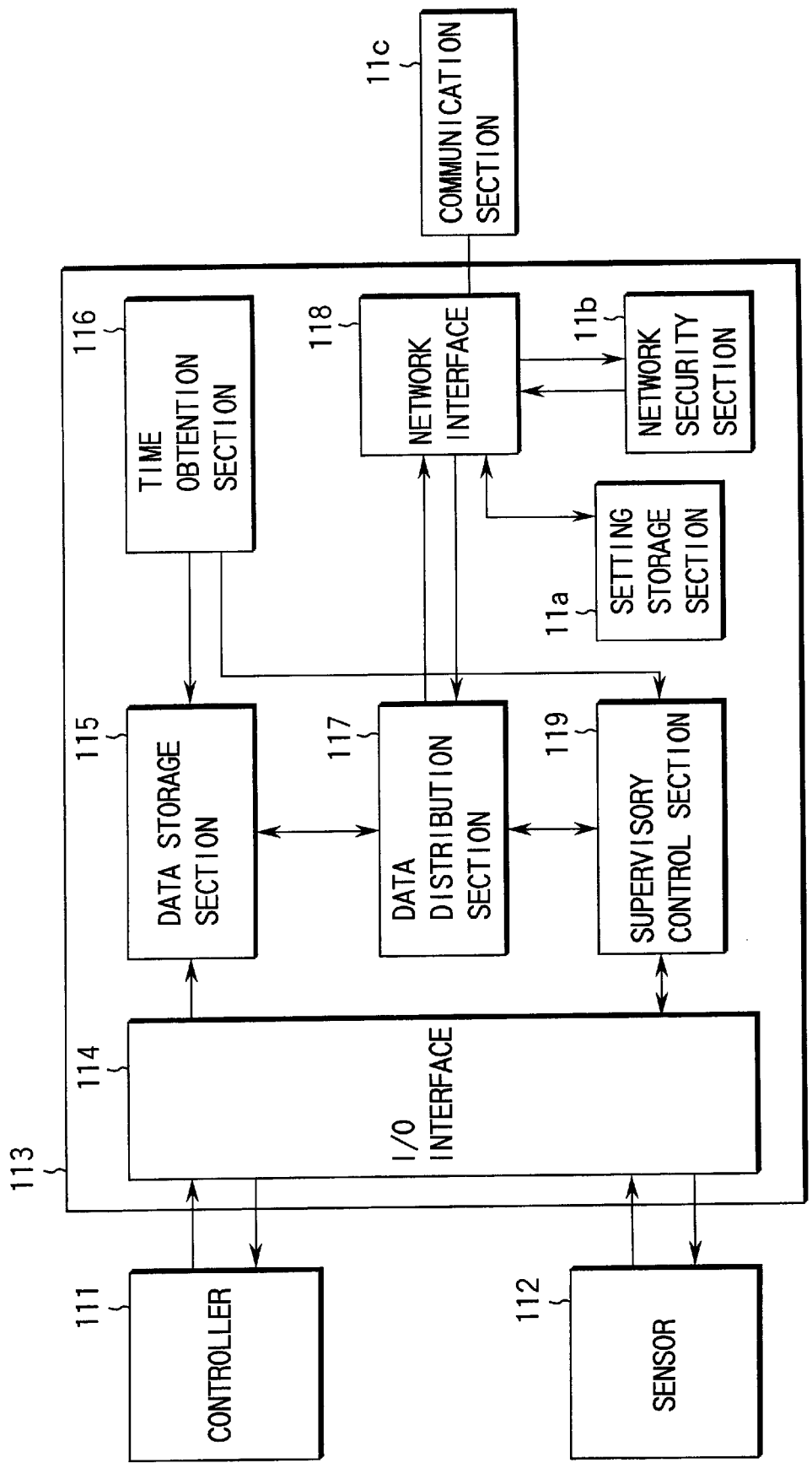
FIG. 5 is a diagram showing a distributed control device according to the present invention.

As shown in FIG. 5, the distributed control device 125 (or 126) comprises an I/O interface 114 for transmitting control signals to a controller (a controlled device) that opens and closes a valve in a water line and obtaining inputs from a sensor 112, a data storage section 115 for storing PIO data from the controller 111, sensor information, and additional information such as obtention time, a time obtention section 116 for adding a time to the data when the data is stored in the data storage section 115, a data distribution section 117 for distributing the PIO data, the sensor information, and other supervisory information, a supervisory control section 119 for carrying out supervisory control using the PIO data from the controller 111 as well as the sensor information, a network interface 118 for communicating with other distributed control devices and the supervisory device, a setting storage section 11a, a network security process section 11b, and a communication section 11c for connecting the other distributed control device 126 (or 125) and the supervisory devices 121 to 123 to the distributed control device 125 (or 126).

Figure 6:
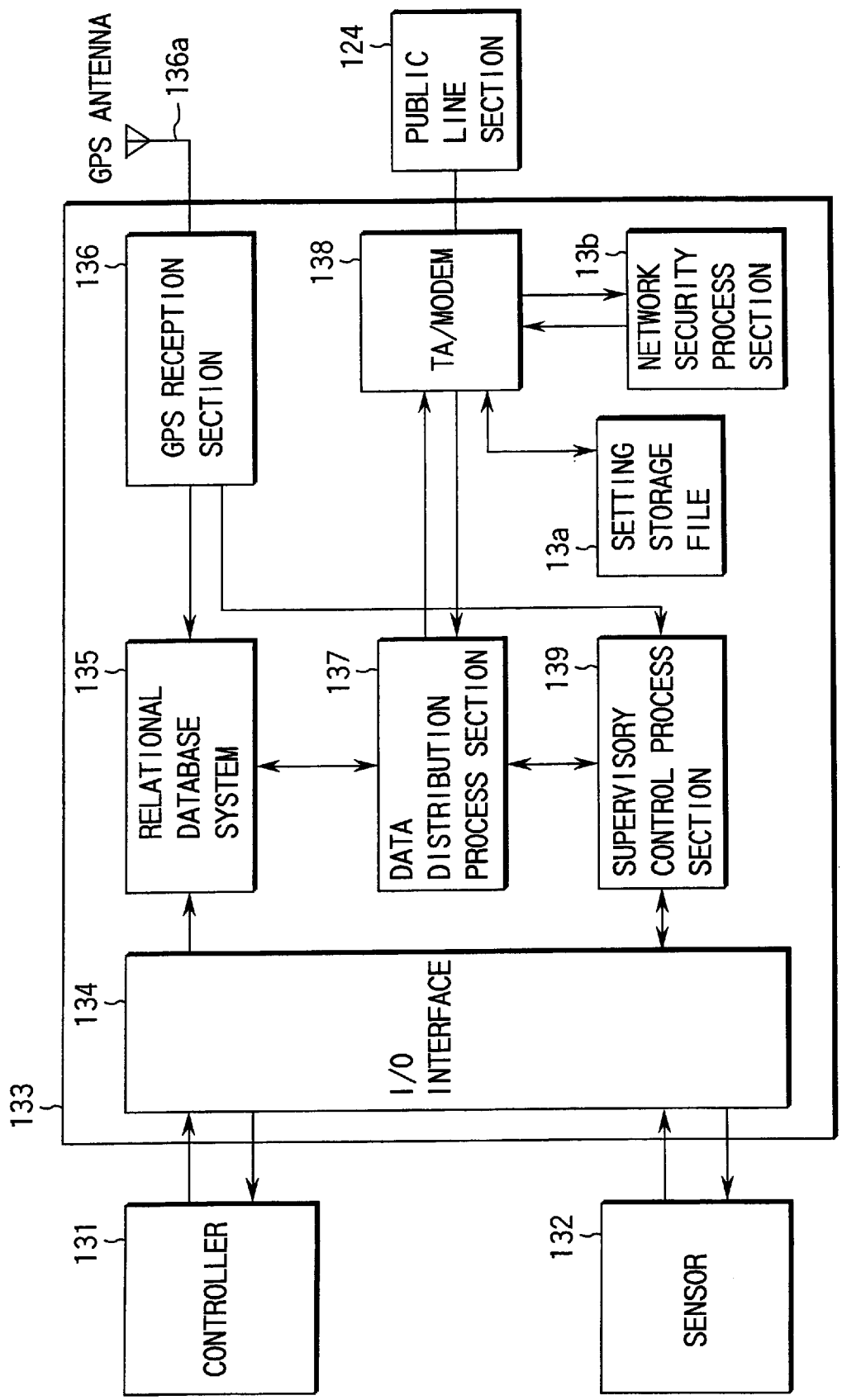
FIG. 6 is a block diagram showing a distributed control device according to a first embodiment of the present invention.

Such a distributed control device 125 (or 126) is further specifically shown by the decentralize control device shown at reference numeral 133 in FIG. 6. That is, in FIG. 6, the distributed control device 133 is constructed on a computer to transmit data between a controller 131 and a sensor 132 via an I/O interface 134 through an RS232C or the like. Data received from the controller 131 and sensor 132 is accumulated in a relational database system 135 with a time obtained from a GPS reception section 136 having a GPS antenna 136a and is simultaneously passed to a supervisory control process 139. The supervisory control process section 139 supervises these data, outputs information on failures or errors to a data distribution process section 137, and controls the controller 131 in response to control commands from the first supervisory device 121, the second supervisory device 122, and the n-th supervisory device 123. The data distribution process section 137 and the supervisory control process section 139 are implemented as a process executed on the computer. The distributed control device 133 is connected via a built-in TA or modem 138 to a public line 124 acting as the communication path and can communicate with the first supervisory device 121, the second supervisory device 122, the n-th supervisory device 123, the first distributed control device 125, and the second distributed control device 126.

Figure 3:
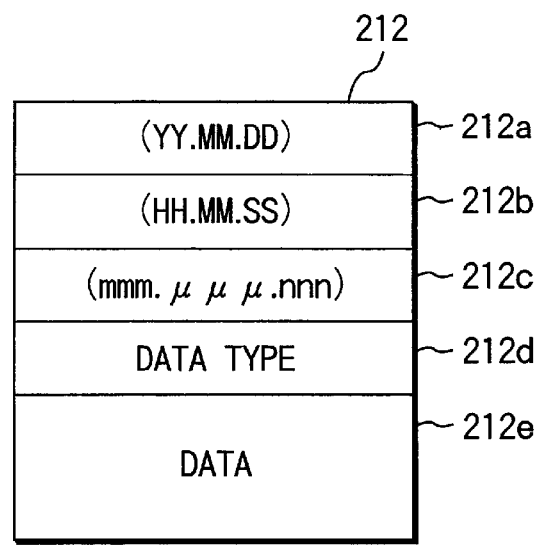
FIG. 3 is a diagram showing a data structure for use in a conventional decentralized supervisory control system.

The I/O interface 114 in FIG. 5 corresponds to the I/O interface 134 in FIG. 6, the data storage section 115 in FIG. 5 corresponds to the relational database system 135 in FIG. 6, the time obtention section 116 in FIG. 5 corresponds to the GPS reception section 136 having the GPS antenna 136a in FIG. 3, the supervisory control section 119 in FIG. 5 corresponds to the supervisory control process section 139 in FIG. 6, the network interface 118 in FIG. 5 corresponds to the TA or modem 138 in FIG. 6, the setting storage section 11a and network security process section 11b in FIG. 5 correspond to a setting storage file 13a and a network security process section 13b in FIG. 6.

Figure 1:
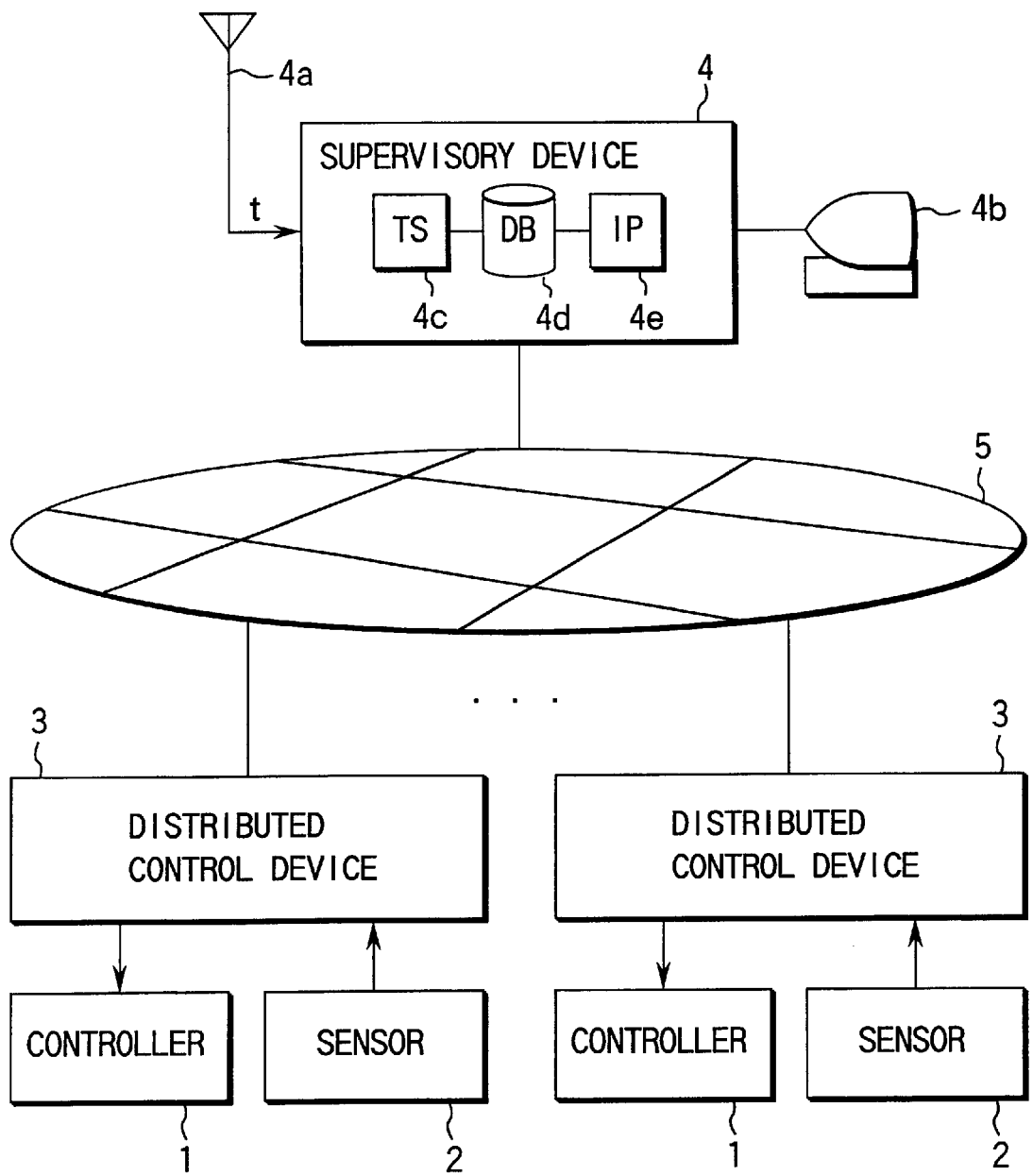
FIG. 1 is a diagram showing the entirety of a conventional decentralized supervisory control system.
Figure 2:
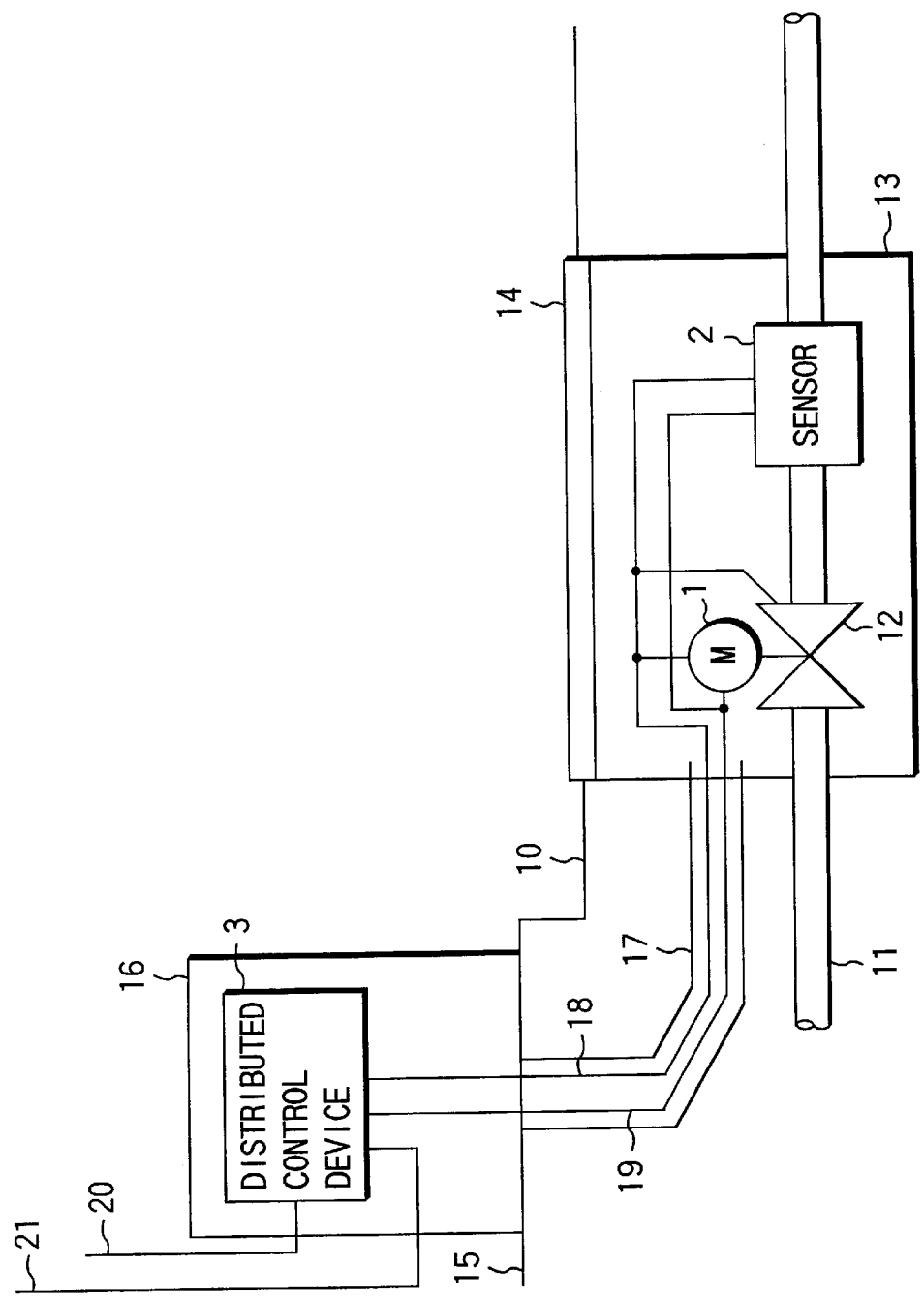
FIG. 2 is a diagram showing how a conventional distributed control device is installed.
Figure 7:
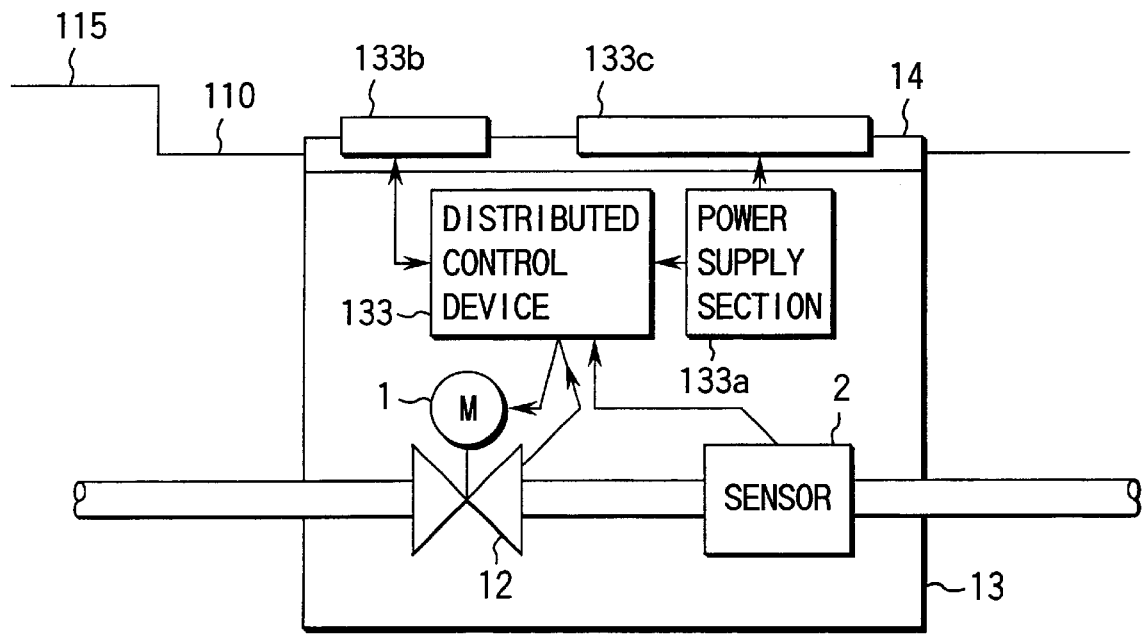
FIG. 7 is a diagram showing an example of how the distributed control device according to the first embodiment is installed.

In addition, the distributed control device 133 in FIG. 6 can be comprised of a single wiring substrate or integrated circuit. The device 133 can be configured as shown in FIG. 7 by focusing on the above point and attempting to construct a standby power supply. That is, as shown in FIG. 2, the water line 11 buried in the roadway 10 has the valve 12, the controller 1 including an actuator for controlling the opening and closure of the valve, and the sensor 2 for measuring flow rate or pressure. The valve 12, the controller 1, and the sensor 2 are placed in the manhole 13 that is occluded by a cover 14.

In this embodiment, the cover 14 has the distributed control device 133 and a power supply section 133a installed on a rear side, while having a communication line antenna and time correcting antenna 133b (136a) installed on a front side. The cover 14 also has a solar cell panel 133c installed thereon. Power from the solar cell panel 133c is provided for the distributed control device 133 via the power supply section 133a.

The operation of the first embodiment as described above will be explained. Data is periodically obtained from the controller 131 and the sensor 132, a received time is obtained from the GPS reception section 136, and the data is added to the relational database using the time as a key. The supervisory control process 139 checks whether the PIO data or the sensor information is within a normal range and sends to the data distribution process 137 the current supervisory information such as equipment states, sensor values, and statuses for a supervised target such as a plant. The data distribution process 137 organizes the current supervisory information and other supervisory information such as trend graphs and error and failure information and distributes the organized information to the supervisory devices 121, 122, 123 via the TA/modem 138 if the public line 124 is connected to the system.

The first embodiment described above in detail has the following effects: In this embodiment, the data accumulation and the supervisory control are executed by the local distributed control devices 113, 125, 126, 133, the data distribution process 137 organizes and distributes required information, and the central supervisory devices 121, 122, 123 simply displays this information, thereby eliminating the need to change the supervisory device side upon redesign. Accordingly, only the distributed control device side needs to be redesigned, thereby improving reliability.

In addition, the conventional installation of the distributed control device requires the communication wiring for transmitting and receiving information to and from the supervisory device, the power supply wiring 20 for operating the distributed control device, and the signal line 18 connected to the sensor 2 and actuator 12 as show in FIG. 2. Consequently, the distributed control device 3 can conventionally be installed only where these wirings are available. The sensor 2 and the actuator 12 should be installed in a space preferable for a target process, in FIG. 2, a water process, but an appropriate location for installing the distributed control device 3 is not always obtained within the space preferable for installing the sensor 2 and the actuator 12. The water line 11 is often buried about 0.5 to 1.5 m under the ground, and the sensor 2 and the actuator 12 are installed, with the line 11, in the manhole 13 under the road. A wiring duct is conventionally passed through the manhole 13 to the road station enclosure 16 installed on the ground, and then has the power supply wiring 19 and signal wiring 18 for the sensor 2 and actuator 12 passed therethrough so as to be connected to the distributed control device 3 installed in the road station enclosure 16. Consequently, when an appropriate location for installing the road station enclosure 16 is not obtained, the sensor 2 or the actuator 12 cannot be installed even in a space suitable for supervisory control in terms of the process structure, that is, in terms of the wiring structure of the water line 11 or the topographical conditions.

In this embodiment, as shown in FIG. 7, the section 113 corresponds to the conventional distributed control device is comprised of a single wiring substrate or integrated circuit to reduce required power and device size, and this power supply section 113 enables the distributed control device 133 to be installed with the sensor 2 for detecting process information and the actuator 12 for manipulating the process. This configuration eliminates the conventional restriction that the sensor 2 and the actuator 12 can be installed only where a space for installing the distributed control device is obtained, and enables the sensor 2 and the actuator 12 to be installed in a space for the process, thereby improving process supervisory controllability.

(Second Embodiment)

Figure 8:
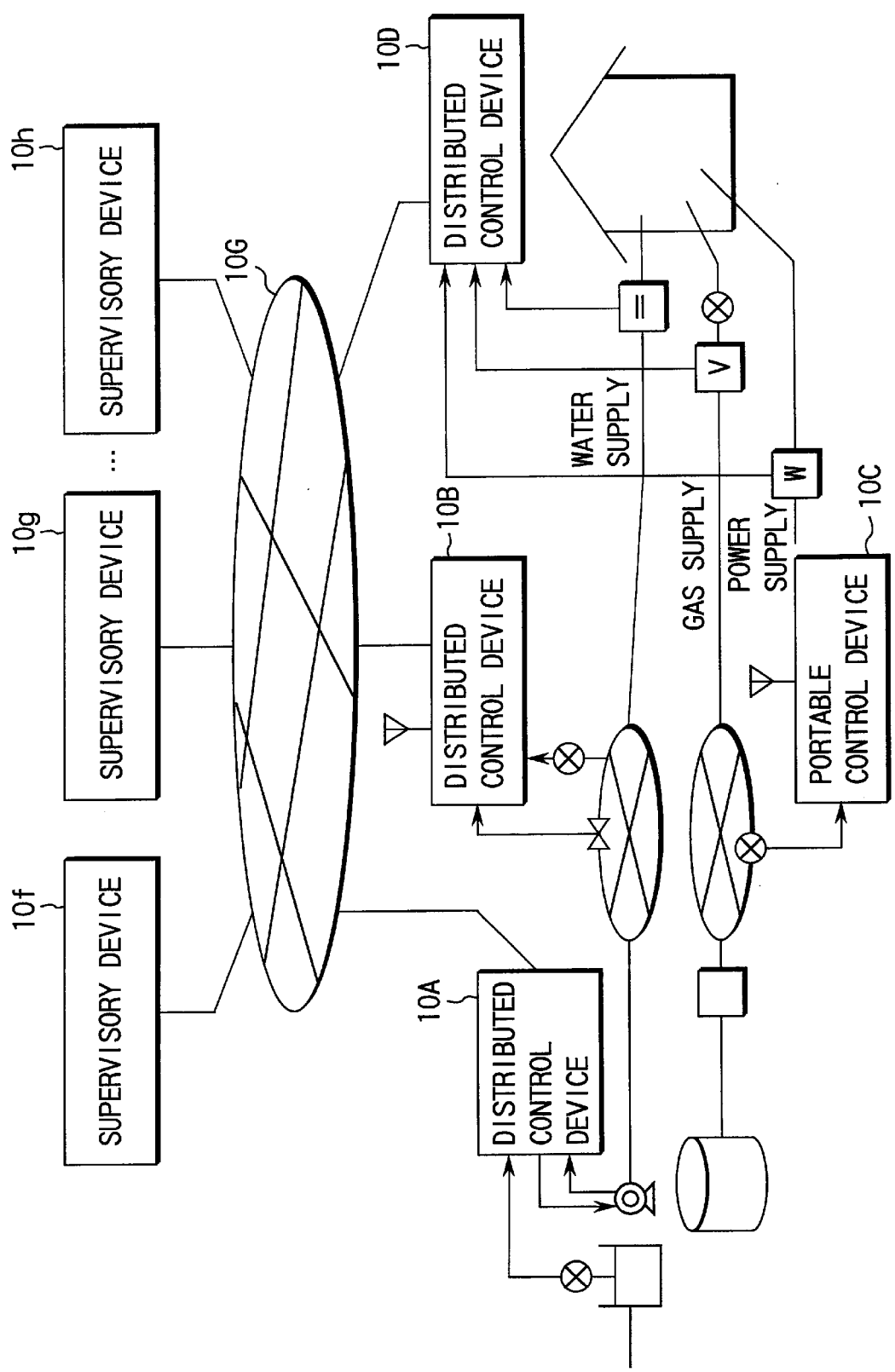
FIG. 8 is a diagram showing an example of how a distributed control device according to a second embodiment of the present invention is installed.

A second embodiment of the present invention will be explained with reference to FIG. 8. Reference numerals 10A to 10D denote local distributed control devices that obtain various sensor information scattered over a wide area and distributes the sensor information to central supervisory devices 10f to 10h via a communication path 10G. The sensor information is widely applicable to water, gas, and power supplies, and the like, and each distributed control device may be located near the sensor or may be portable so as to be carried to a neighborhood of the sensor in order to collect sensor information.

(Third Embodiment)

Figure 9:
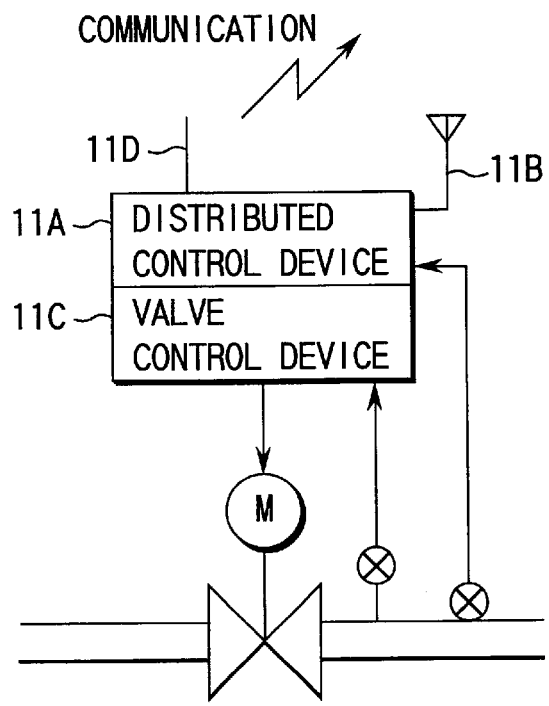
FIG. 9 is a diagram showing an example of how a distributed control device according to a third embodiment of the present invention is installed.

A third embodiment of the present invention will be described with reference to FIG. 9. This figure shows an example of implementation of a distributed control device wherein a decentralized control 11A with a GPS antenna 11B is integrated into a valve control device 11C for a motor-operated valve for integral use. This can advantageously serves to omit installation of cables for communicating signals with the valve control device 11C. Of the signals obtained by the distributed control device 11A, data to distribute to the central supervisory device through communication can be transmitted using, for example, a built-in wireless or PHS line and an antenna 11D.

(Fourth Embodiment)

Figure 10:
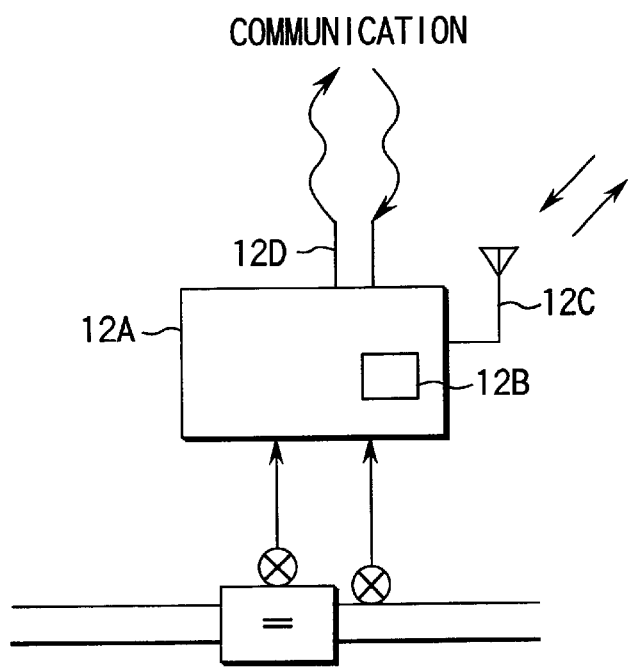
FIG. 10 is a diagram showing an example of how a distributed control device according to a fourth embodiment of the present invention is installed.

A fourth embodiment of the present invention will be described with reference to FIG. 10. FIG. 10 shows an example of implementation of a distributed control device wherein a distributed control device 12A with a GPS antenna 12C has a positional-information detection section 12B for detecting positional information based on information from a PHS antenna or the like 12D, to detect PHS or GPS coordinates to communicate its own coordinate information to the central supervisory device through a communication section.

With this configuration, distributed control devices can be appropriately located even if they are scattered over a wide area, are portable, or installed under the ground. Thus, maintenance and sensor information can also be located after installation, so that this embodiment is applicable to wide-area management such as water operation and management.

(Fifth Embodiment)

Figure 11:
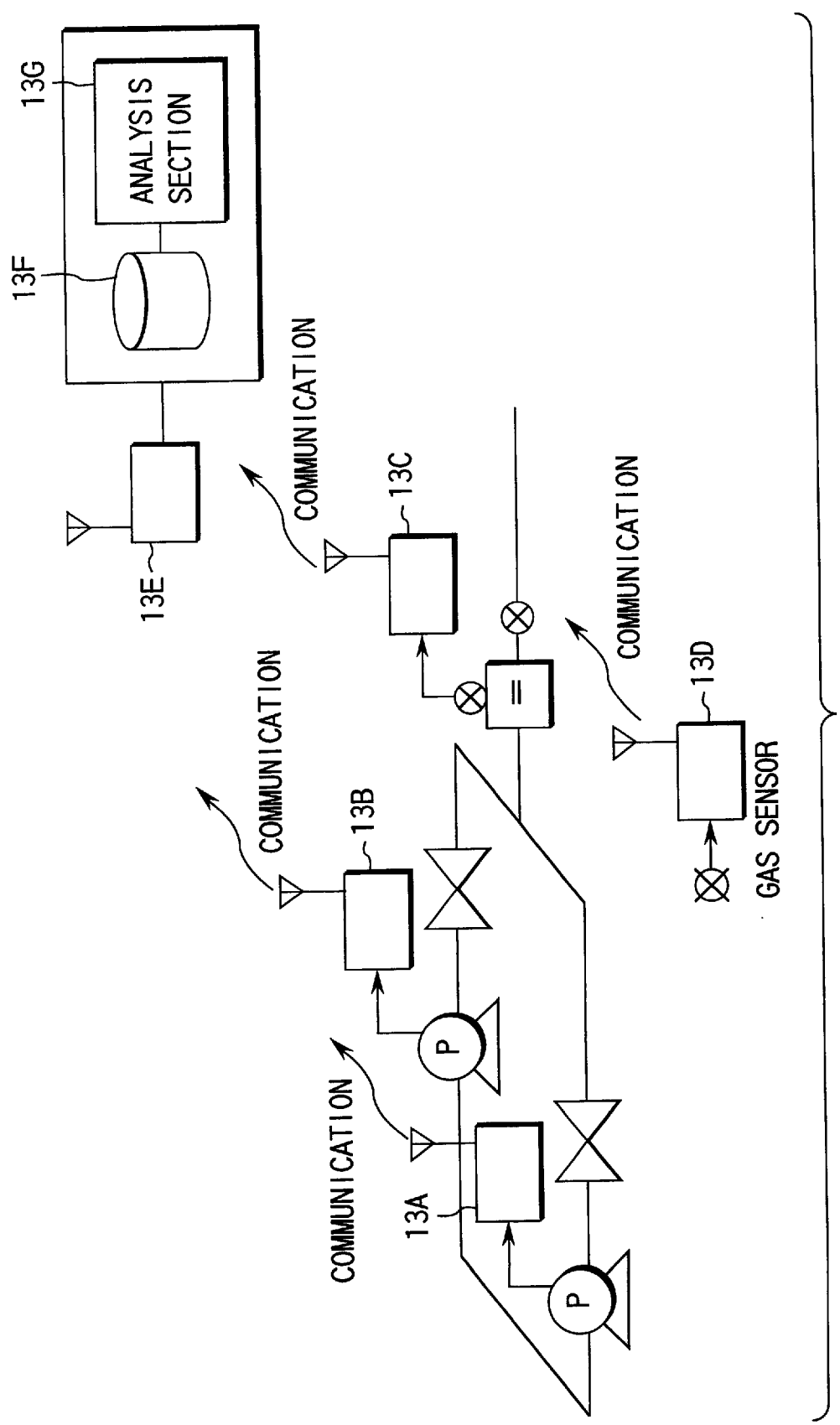
FIG. 11 is a diagram showing an example of how a distributed control device according to a fifth embodiment of the present invention is installed.

A fifth embodiment will be explained with reference to FIG. 11. FIG. 11 shows an example of implementation of distributed control devices that are applied to a plant or a city.

Decentralized control devices 13A to 13D in this embodiment each transmit to a central supervisory device 13E via a communication line, sensor information for example, pump, water volume, or gas pressure information with coordinate and time information on a location in which it is installed. The supervisory device 13E accumulates the received data in a data accumulation section 13F such as an HDD, and an analysis section 13G analyzes the data to assume, for example, a position at which a water line is cut or a gas is leaking.

(Sixth Embodiment)

A sixth embodiment will be described with reference to FIG. 12. This figure is a block diagram of a distributed control device wherein the same parts as in FIG. 5 are given the same reference numerals. A distributed control device 113' in this embodiment is the same as the distributed control device 113 in FIG. 5 except for an additional time setting section 221.

Figure 13:
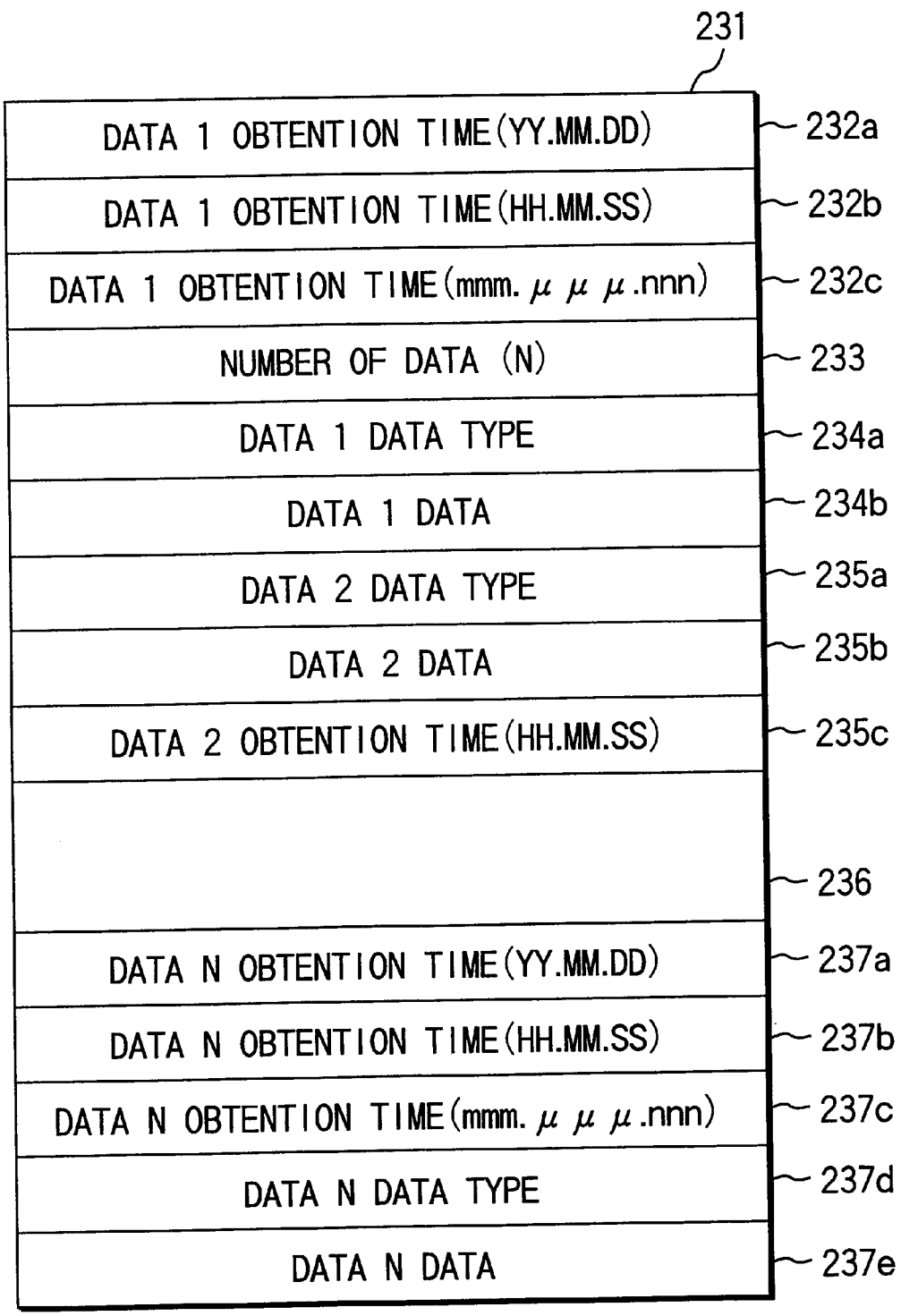
FIG. 13 is a diagram showing a data structure for use in the sixth embodiment.

The structure of transmitted data in this embodiment will also be explained with reference to FIG. 13. Reference numeral 231 denotes the structure of transmitted data in this embodiment, containing the amount of data indicated by the number (N) at 233. The order of data 1 to N is determined by sorting these data from the data storage section 115 in the order of occurrence based on time stamp information. Detailed time information can be provided by setting time stamp data for the earliest data 1 and latest data N obtained from the data storage section, as they are.

On the other hand, the intermediate data 2 to N−1 have their occurrence order determined and thus additionally contain a minimum amount of time information required for the central supervisory device, for example, only hour, minute, and second.

This data structure serves to omit transmission of (N−2)× 2×32 bits of unwanted data compared to the prior art.

Figure 12:
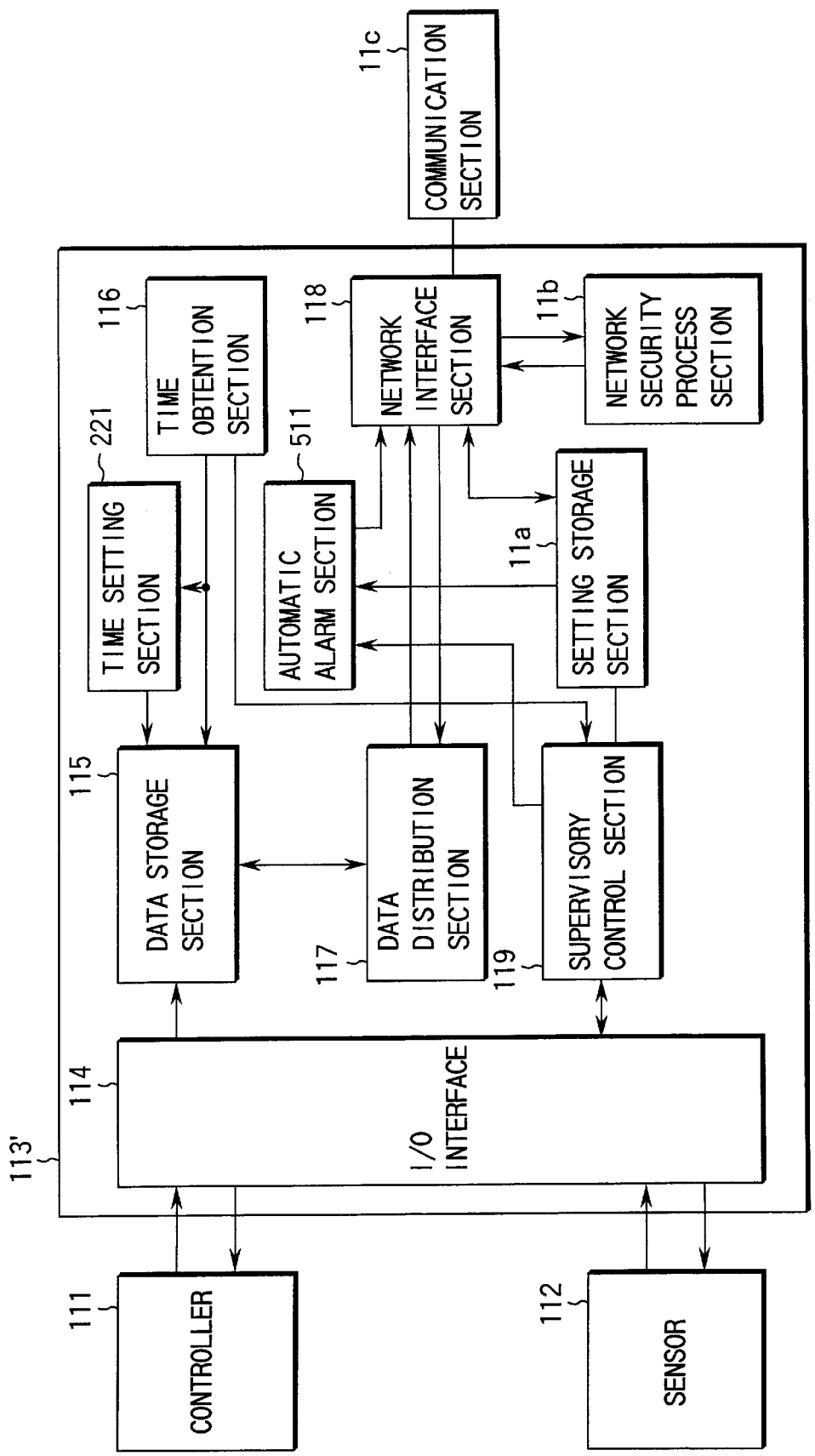
FIG. 12 is a diagram showing an example of how a distributed control device according to a sixth embodiment of the present invention is installed.
Figure 14:
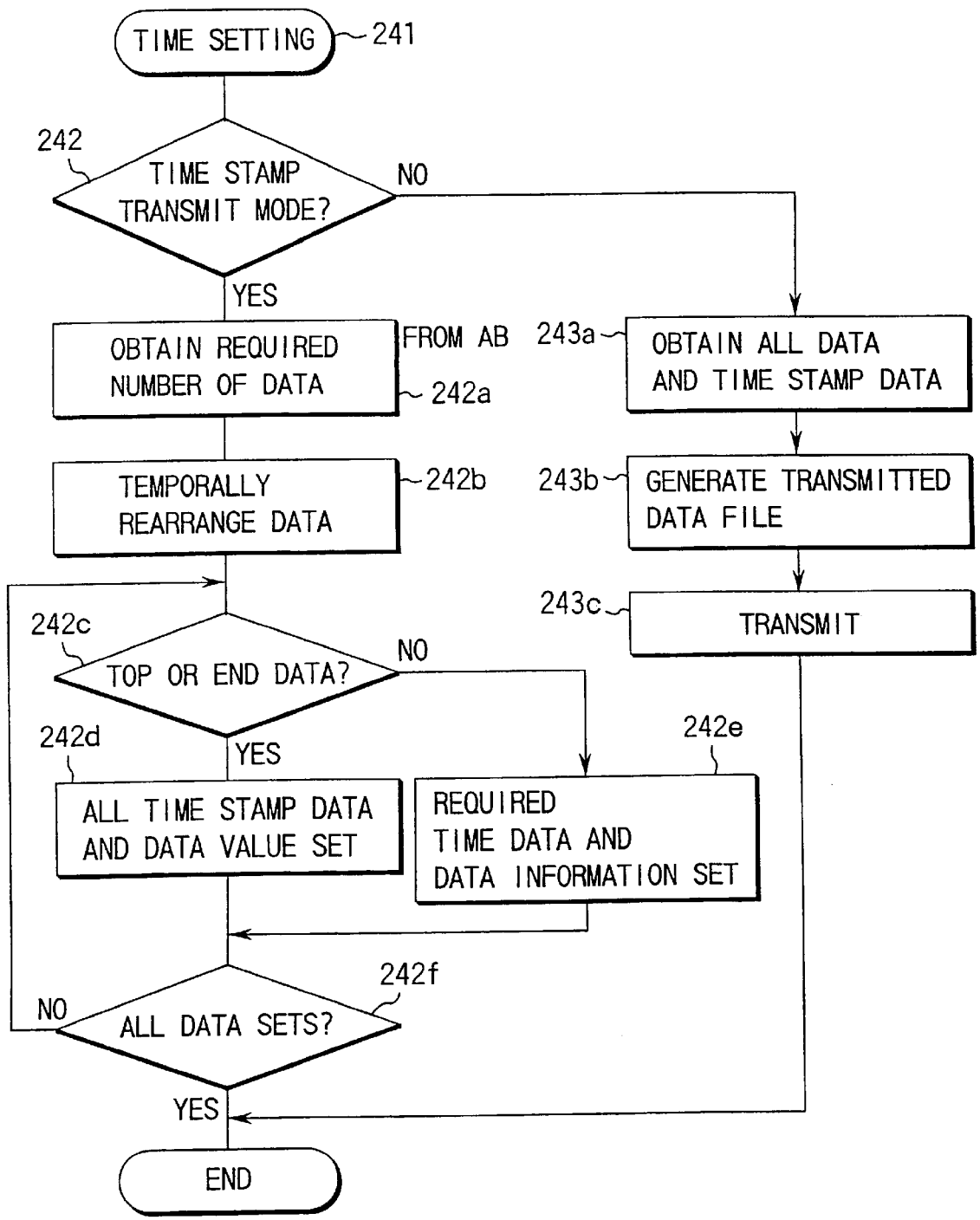
FIG. 14 is a diagram showing processing carried out by a time setting section according to the sixth embodiment.

FIG. 14 is a process flow of the time setting section 221 in FIG. 12. When a time setting input 241 is provided to enter a determination step 242, it is determined whether or not the data is to be rearranged into the data structure in FIG. 13 for data transmission. If the result of the determination is negative, the process shifts to steps 243a, 243b, 243c to use the same structure as in the prior art for transmission. If, however, the result is affirmative, data from a data storage mechanism is sorted based on its time information and rearranged into the structure shown in FIG. 13 at reference numeral 231 through steps 242c, 242d, 242e, 242f.

(Seventh Embodiment)

Figure 15:
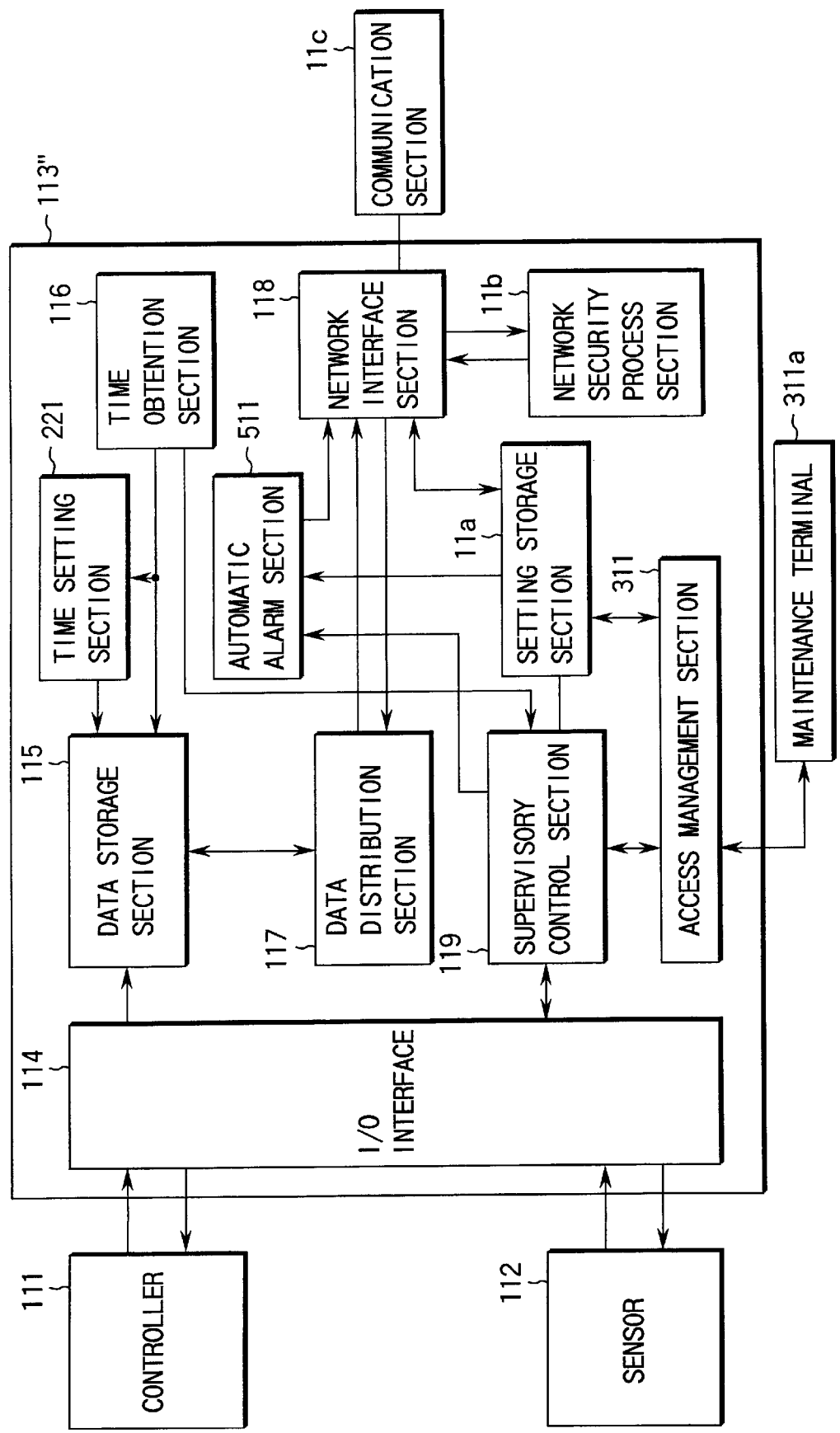
FIG. 15 is a block diagram showing a distributed control device according to a seventh embodiment of the present invention.

A seventh embodiment will be described with reference to FIG. 15. This figure is a block diagram of a distributed control device wherein the same parts as in FIGS. 5 and 12 are given the same reference numerals. A distributed control device 113" in this embodiment is the same as the distributed control device 113' in FIG. 12 except for an additional access management section 311 connecting to a maintenance terminal 311a.

The access management section 311 detects a connection status of the maintenance terminal 311a and the contents of its executions, that is, whether the maintenance terminal is in a mode for simply monitoring the status of the supervisory control section of this distributed control device, a mode capable of updating or partly changing a supervisory screen in the supervisory section before downloading, or a mode capable of independently carrying out debugging or the like to directly modify various data in the distributed control device 113".

Figure 16:
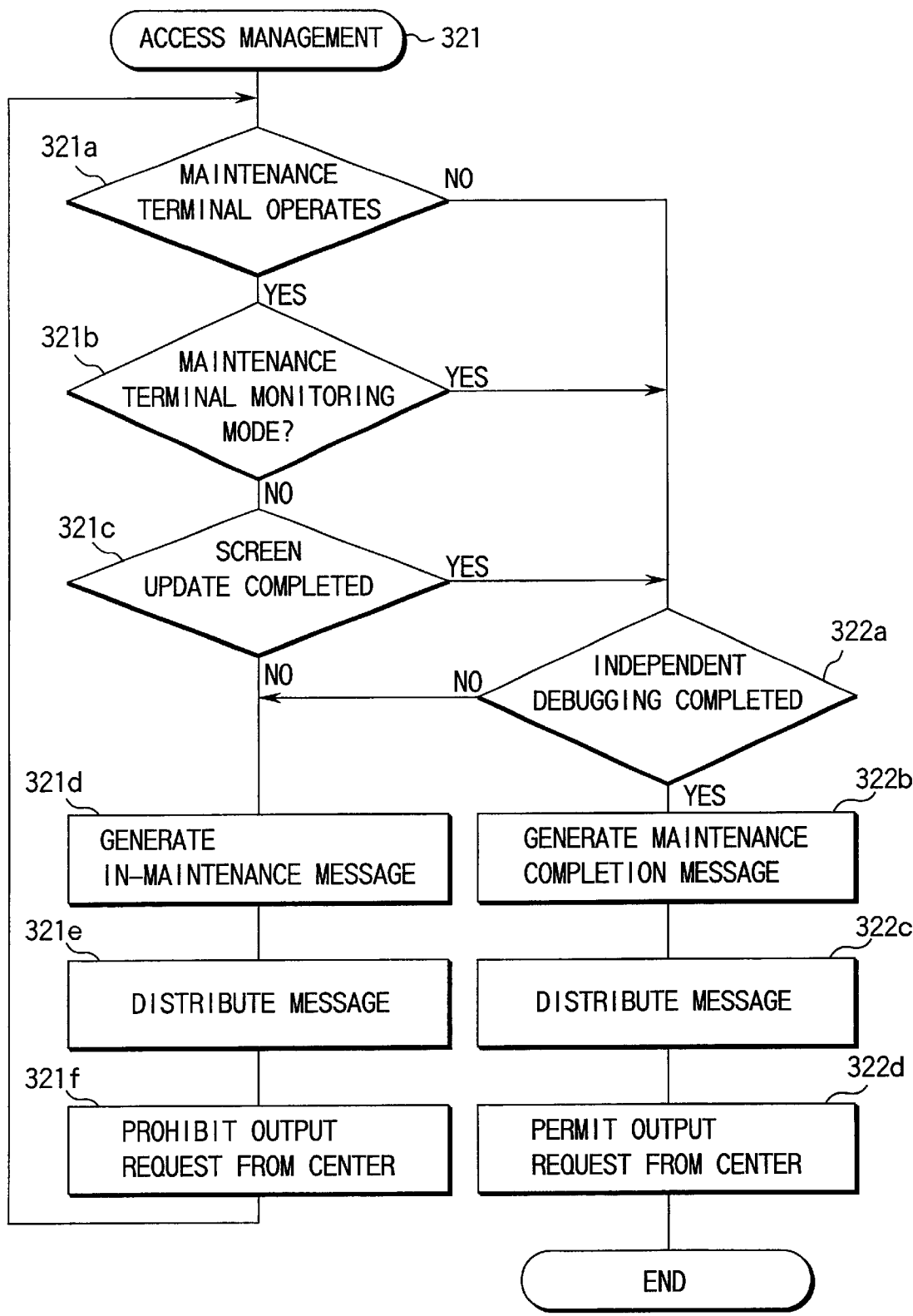
FIG. 16 is a flow chart showing processing according to the seventh embodiment.

FIG. 16 shows a flow of operations in the above described access management section 311. When an access management input 321 is provided to enter a determination step 321a and if it is determined that the maintenance terminal 311a is connected, the process shifts to a determination step 321b to check how the screen has been modified or updated at steps 321b, 321c. In addition, if the maintenance terminal 311a is not connected and the process shifts to a determination step 322a, it is determined whether or not the maintenance terminal is in the debug mode.

In either way, if the maintenance terminal is in the mode capable of directly manipulating various data in the distributed control device 113", the access management section 311 generates a message at a step 321d indicating to the central supervisory device that it is carrying out maintenance, and then distributes this message at a step 321e. In the meantime, the access maintenance section 311 commands suspension of supervision, notification of the operational status of the current distributed control device, and monitoring of another distributed control device. In addition, at a step 321f, if another distributed control device issues a command for an output from a controller directly associated with operation of external equipment, its operation is prohibited. If the access management section recovers to the mode for normal operations, then it generates a message indicating that it can carry out normal supervisions and distributes this message to the center, at steps 322b, 322c. Then, at a step 322d, the access management section accepts the request for an output to the external equipment, which has been prohibited.

(Eighth Embodiment)

Figure 17:
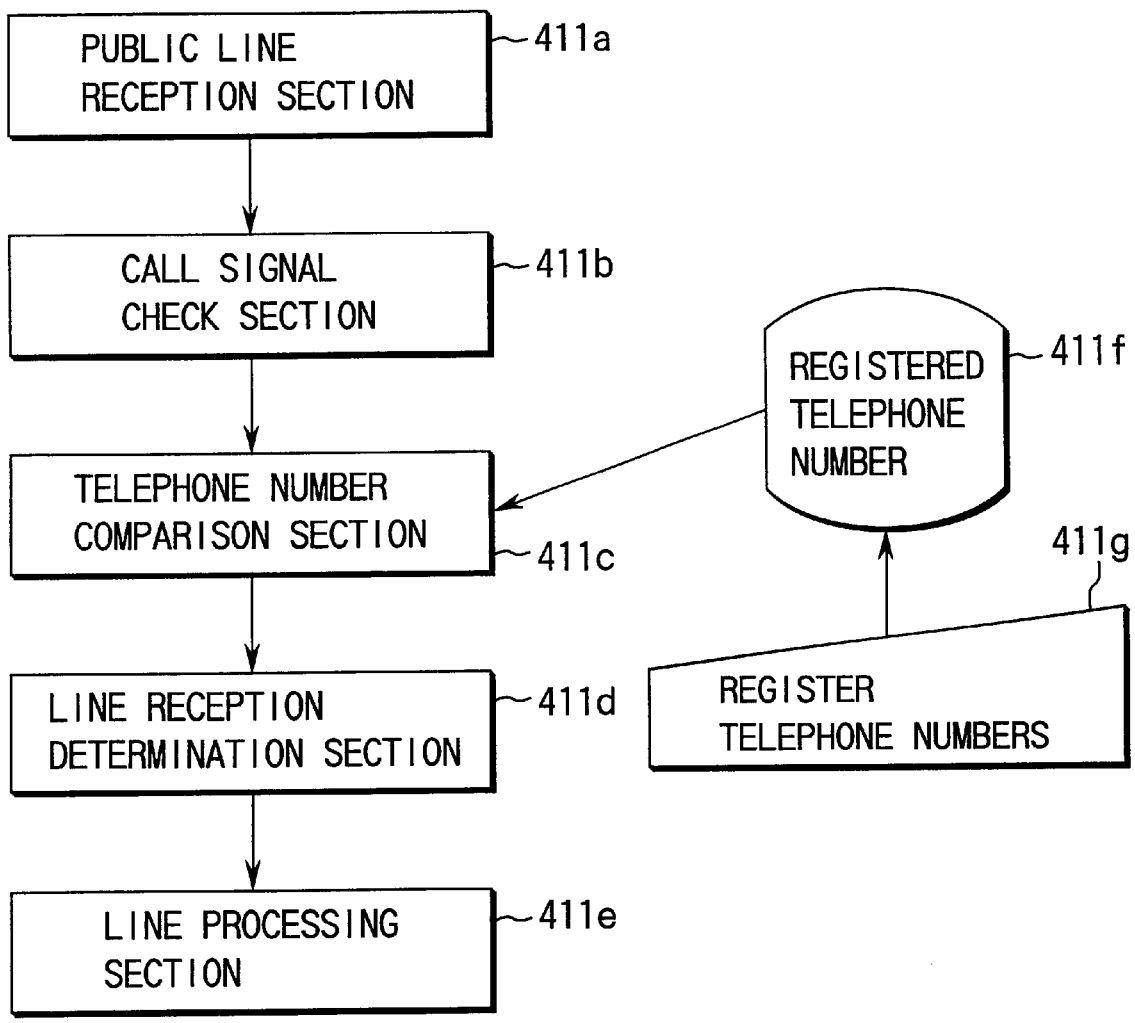
FIG. 17 is a block diagram of a distributed control device according to an eighth embodiment of the present invention.

An eighth embodiment of the present invention will be described with reference to FIG. 17. FIG. 17 is a detailed block diagram of the network security process section 11b in FIGS. 5 and 15. In a block 411a, a line reception section is processed, and in a block 411b, a destination checks a calling telephone number as shown on a numbers display. In a block 411g, permitted telephone numbers are registered in a nonvolatile storage section 411f that register telephone numbers. After the calling telephone number has been detected in the block 411b, it is compared with the data in the registered telephone number storage section 411f, in a block 411c, and it is determined in a block 411d whether or not the reception line is to be accepted or prohibited.

Figure 18:
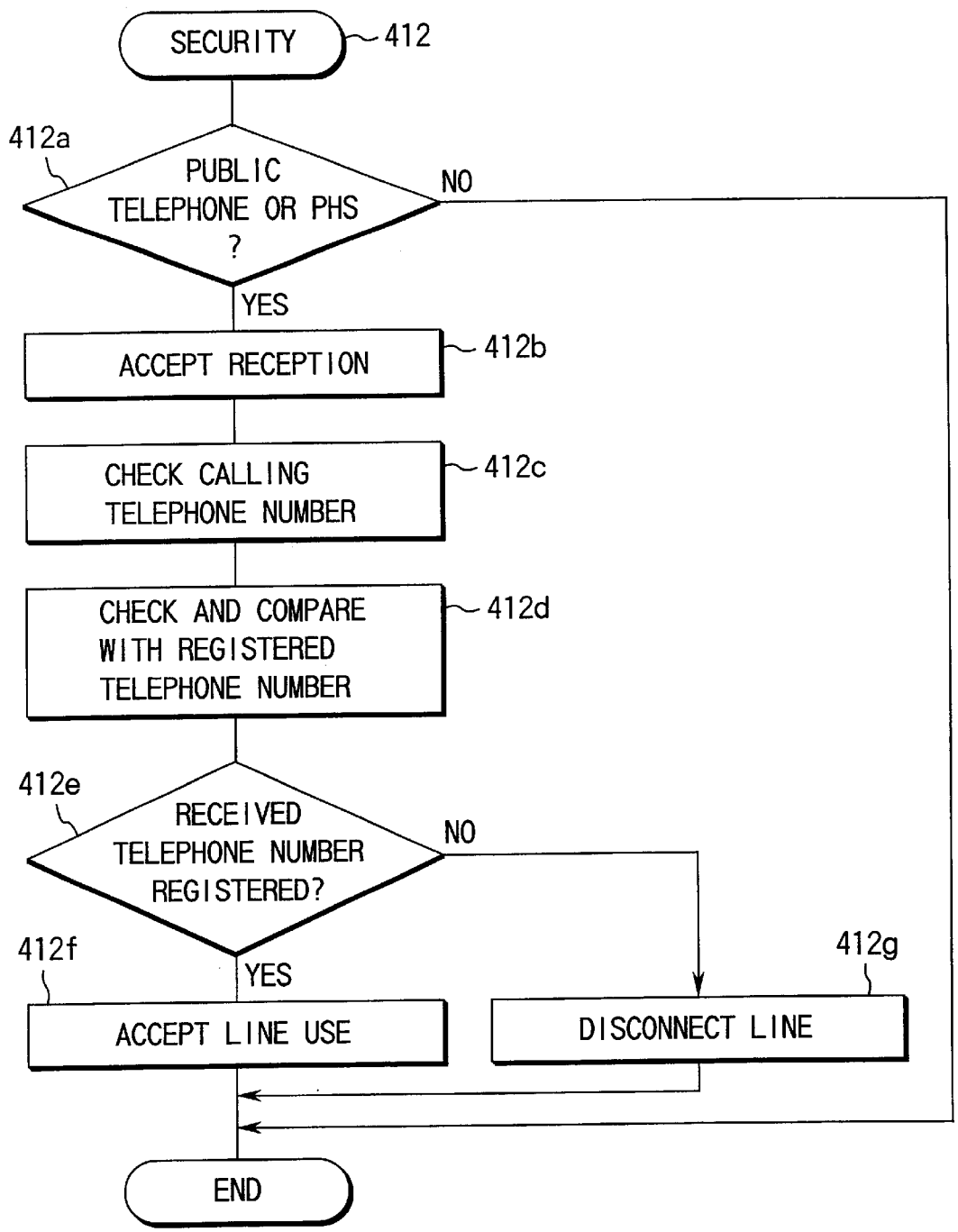
FIG. 18 is a flow chart showing a line security process according to the eighth embodiment.

FIG. 18 shows a flow in the network security process section 11b. As described above, the calling telephone number is retrieved in a block 412c. In a block 412d, it is confirmed that this telephone number is registered as accessible, and if it is determined that there is no problem, the process shifts to a block 412f to permit the use of the line and an access thereto.

(Ninth Embodiment)

Figure 19:
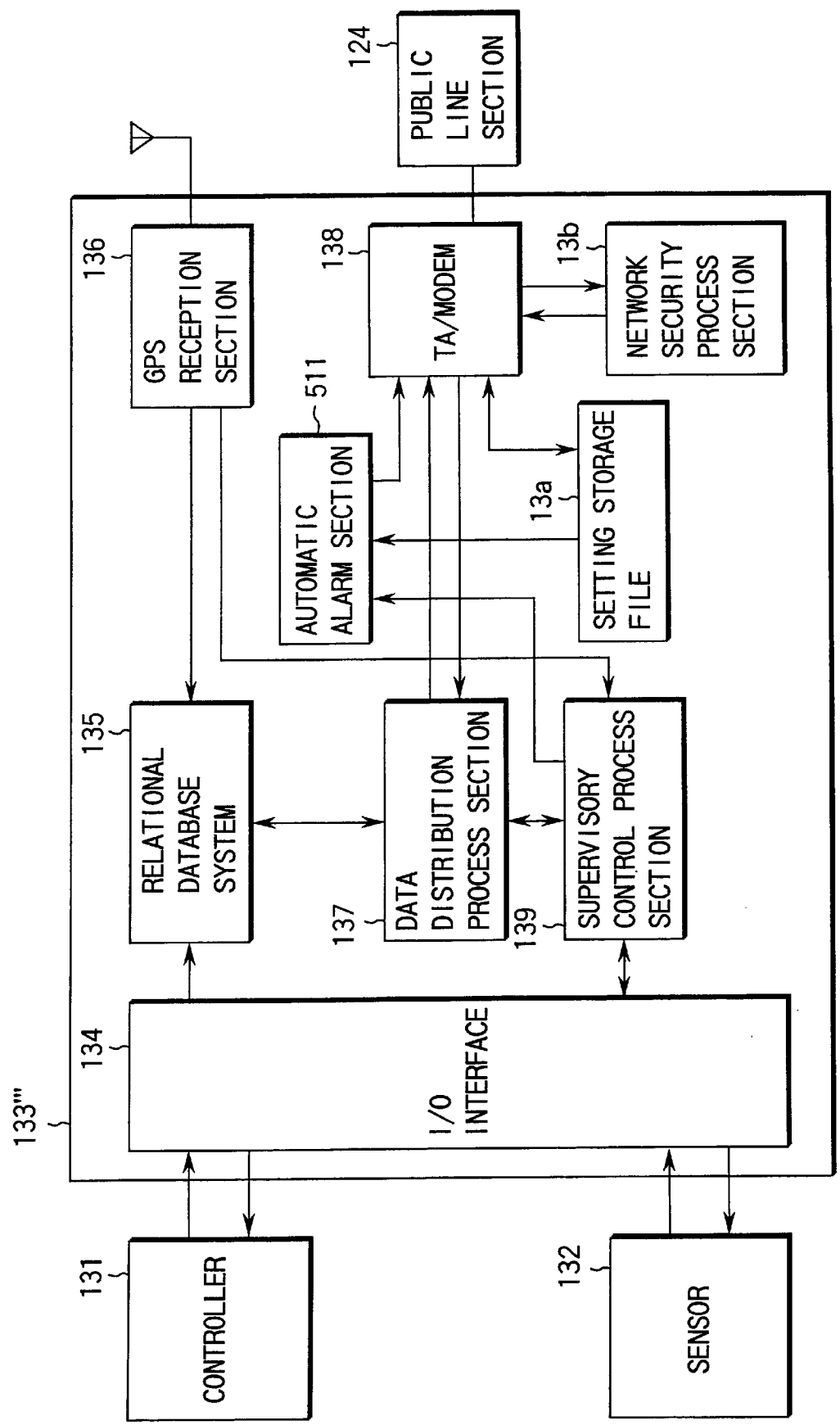
FIG. 19 is a block diagram of a distributed control device according to a ninth embodiment of the present invention.

A ninth embodiment of the present invention will be explained with reference to FIG. 19. This figure is a block diagram of a distributed control device wherein the same parts as in FIG. 6 are given the same reference numerals. A distributed control device 133''' in this embodiment is the same as the distributed control device 133 in FIG. 6 except for an additional automatic alarm process 511. The automatic alarm process section 511 is implemented as a process executed on a computer.

In this embodiment, data is periodically obtained from the controller 131 and the sensor 132, a received time is obtained from the GPS reception section 136, and the data is added to the relational database using the time as a key. The supervisory control process 139 checks whether the PIO data or the sensor information is within a normal range and sends to the data distribution process 137 the current supervisory information such as equipment states, sensor values, and statuses for a supervised target such as a plant. The supervisory control process 139 also sends events such as errors/failures to the automatic alarm process 511. If the sent event is one that is to be notified and that is stored in the setting storage section 13a, the automatic alarm process section 511 automatically sends a control command to the TA/modem 138 and dial-up-connects to the supervisory device via the public line 124 to notify it of the error or failure.

Thus, according to this embodiment, the distributed control device 133''' can carry out data accumulation and supervisory control, and to notify the center of a failure or an error, the automatic alarm process section 511 can automatically connect to the supervisory device for notification. Therefore, even a system comprising a large number of distributed control devices can efficiently perform central supervisory operations.

(Tenth Embodiment)

Figure 20:
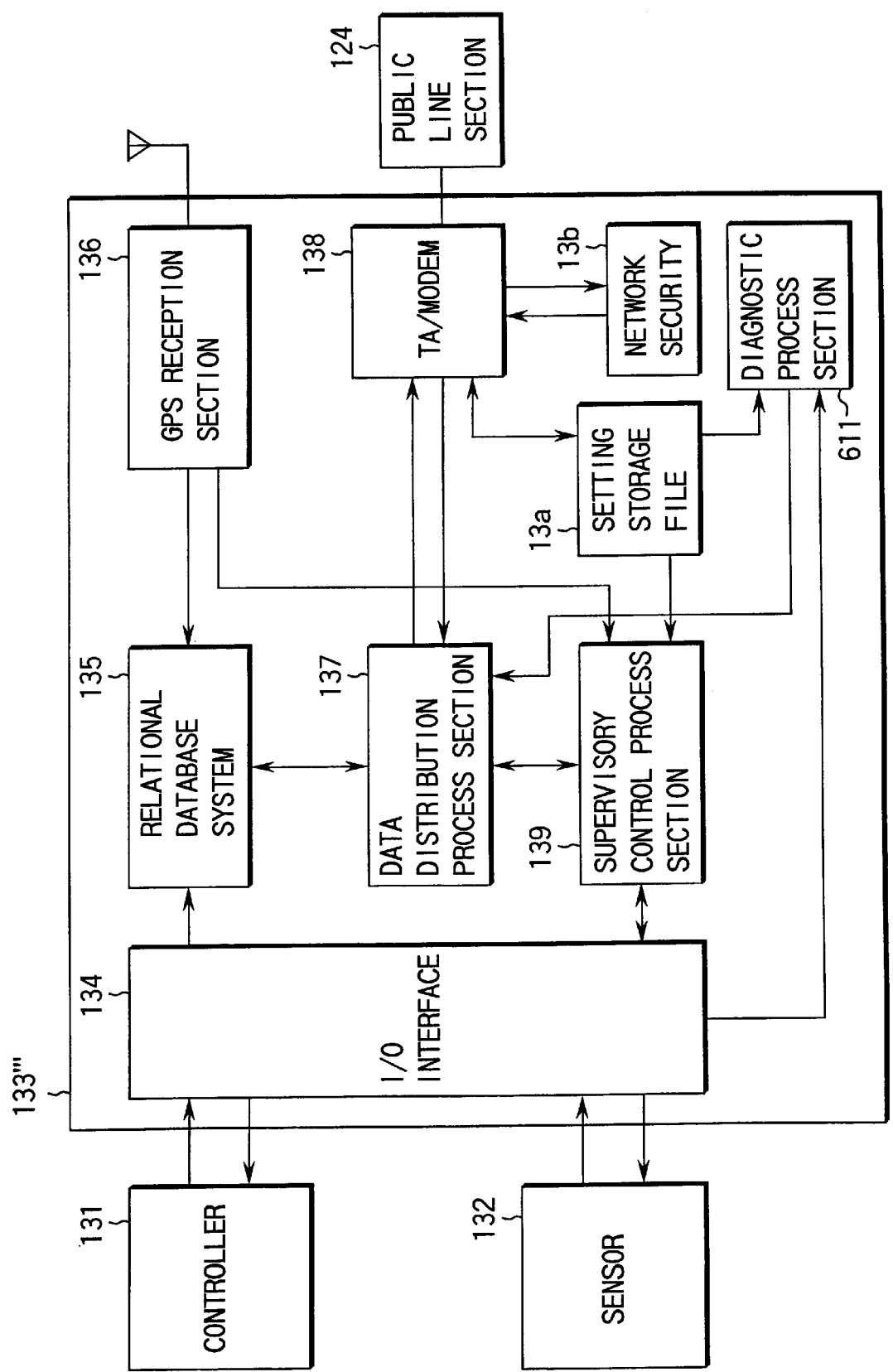
FIG. 20 is a block diagram of a distributed control device according to a tenth embodiment of the present invention.

A tenth embodiment of the present invention will be explained with reference to FIG. 20. This figure is a block diagram of a distributed control device wherein the same parts as in FIG. 6 are given the same reference numerals. A distributed control device 133''' in this embodiment is the same as the distributed control device 133 in FIG. 6 except for an additional diagnostic process section 611. The diagnostic process section 611 is implemented as a process executed on a computer.

In this embodiment, data is periodically obtained from the controller 131 and the sensor 132, a received time is obtained from the GPS reception section 136, and the data is added to the relational database using the time as a key. In this case, the periodic data is also sent to the diagnostic process section 611. If reception of the periodic data is suspended for a fixed amount of time set in the setting storage section 13a, the diagnostic process section 611 notifies the data distribution process section 137 of this suspension as an error in the controller 131 or sensor 132 in order to notify the central supervisory device of the same. The diagnostic process section 611 attempts to communicate with another distributed control device set in the setting storage section 13a at intervals of a fixed amount of time set in the setting storage section 13a, to check whether this distributed control device is operating correctly. If this distributed control device does not respond, the diagnostic process section 611 determines that this distributed control device is malfunctioning and notifies the data distribution process 137 of this status in order to notify the central supervisory device of the same.

As described above, this embodiment checks the controllers and the sensors for failures or errors and allows the distributed control devices to check one another to make notification upon an error or a failure. This embodiment thus improves reliability and reduces loads on the central supervisory device associated with management of the distributed control devices as well as communication traffic required to check for correct operations, thereby enabling efficient operations.

As described above in detail, according to the present invention, the local distributed control devices carries out data accumulation and supervisory control of a plant, and the central supervisory device only displays the results, thereby eliminating the need to change the supervisory device side upon redesign. Therefore, the present invention can provide a decentralized supervisory control system that requires only the distributed control device side to be redesigned, thereby improving reliability.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed control device for transmitting and receiving information to and from a supervisory device via a communication path, the supervisory device providing information for an operator, the distributed control device being connected to a controlled device in a plant to control the controlled device and input and output plant information, the distributed control device comprising:

an I/O interface for transmitting control signals to a controller for said controlled device and obtaining inputs from a sensor;

data storage means for storing PIO data from said controller, sensor information, and additional information such as data obtention time;

time obtention means for adding a time to data when the data is stored in the data storage means;

data distribution means for distributing said PIO data, said sensor information, and other supervisory information;

supervisory control means for carrying out supervisory control using the PIO data from said controller as well as the sensor information;

a network interface for communicating with other distributed control devices and said supervisory device; and communication means for connecting the distributed control device to said other distributed control devices and said supervisory device.

2. A distributed control device according to claim 1, further comprising time obtention means for obtaining a date and time, the device operating upon inputting plant information, to add the obtained time information to the plant information before transmitting the plant information.

3. A distributed control device according to claim 1, further comprising time obtention means for obtaining a date and time, the device adding the obtained time information to the plant information before transmitting the plant information via said communication path.

4. A distributed control device according to claim 1, wherein one distributed control device is connected to a plurality of supervisory devices via said communication path.

5. A distributed control device according to claim 1, wherein one supervisory device connects to a plurality of distributed control devices via said communication path.

6. A distributed control device according to claim 1, wherein at least one of said supervisory device and said distributed control devices comprises:
means for accumulating information obtained from the plurality of distributed control devices via the communication path;
means for rearranging plant information sent from each distributed control device, based on the time information added to the plant information;
means for accumulating the rearranged plant information using as a rearrangement key the time information added to the plant information; and
means for sending out the accumulated information to other supervisory devices or other distributed control devices.

7. A distributed control device according to claim 1, wherein said data storage means comprises time setting means for obtaining stored data and time information, sorting data in an order of occurrence based on the time information, resetting time data required by said supervisory device for supervisions, combining reset time data to said sorted data, and distributing the combined data to said supervisory device via said data distribution means.

8. A distributed control device according to claim 1, further comprising access management means for limiting accesses from said supervisory device via said communication means during maintenance of said supervisory control means via a maintenance terminal.

9. A distributed control device according to claim 1, further comprising means for registering a telephone number, means for retrieving a calling telephone number, and network security means for comparing the registered telephone number with the calling telephone number.

10. A distributed control device according to claim 1, further comprising automatic alarm means operating when an event results from a process executed by said supervisory control means on the controller PIO data or sensor information input by the controller or sensor via the I/O interface, to automatically notify said supervisory device of the event.

11. A distributed control device according to claim 1, further comprising diagnostic means for periodically receiving the PIO data from said controller as well as the sensor information, checking whether or not said controller and said sensor are operating correctly based on the received data, allowing decentralized controlled devices within a same group to communicate periodically and mutually so as to check whether or not they are operating correctly, and communicating check results to said supervisory device.

12. A decentralized supervisory control system comprising a supervisory device for providing information for an operator, a distributed control device connected to a controlled device in a plant to control the controlled device and to input and output plant information, and a communication path for communicating information between said supervisory device and said distributed control device, wherein:
said distributed control device comprises:
means for inputting information for use in supervising the plant;
means for accumulating the information;
means for sending out the information from the information accumulation means to the supervisory device via the communication path;
means for processing the input or accumulated information into information that is sensed by an operator and presenting the processed information to said supervisory device via said communication path;
means for controlling the plant in accordance with an operator's commands obtained from said supervisory device via said communication path; and
means for outputting signals to the plant in response to the operator's commands,
said supervisory device comprising:
means for converting the information obtained from said distributed control device via said communication path and used to supervise and control the plant, into information that is sensed by the operator, and presenting the converted information to the operator; and
means for replacing the operator's commands with signals and communicating the replaced signals to said supervisory device via said communication path.

13. A decentralized control system according to claim 12, wherein the means of said distributed control device for inputting information for use in supervising the plant comprises means for inputting plant information such as process statuses, measured values obtained in the plant, and accumulated values of the measured values, history of the plant, alarm information, history of alarm information, plant configuration information, voice information, plant flow screen information, screen information, vibration information and odor is used to supervise the plant.

14. A decentralized control system according to claim 12, wherein the converting means of said distributed control device information used to supervise and control the plant into information that is sensed by the operator, and presenting the converted information to the operator, converts plant information such as plant statuses, measured values obtained in the plant, and accumulated values of the measured values, history of the plant, alarm information, history of alarm information such as alarms, plant configuration information, plant flow screen information, screen information, voice information, vibration information and odor, which are used to supervise the plant, all of said information being obtained from said distributed control device via said communication, path is changed into image information, voice information, tactile information, palate information, and odor information which are sensed by the operator, the change occuring before presenting the converted information to the operator.

15. A decentralized supervisory control system according to claim 12, wherein said distributed control device comprises time obtention means for obtaining a date and time, and upon inputting plant information, adds the obtained time information to the plant information before transmitting the plant information.

16. A decentralized supervisory control system according to claim 12, wherein said distributed control device comprises time obtention means for obtaining a date and time, and adds the obtained time information to the plant information before transmitting the plant information via said communication path.

17. A decentralized supervisory control system according to claim 12, wherein one distributed control device is connected to a plurality of supervisory devices via said communication path.

18. A decentralized supervisory control system according to claim 12, wherein one supervisory device connects to a plurality of distributed control devices via said communication path.

19. A decentralized supervisory control system according to claim 12, wherein at least one of said supervisory device and said distributed control device comprises means for accumulating information obtained from a plurality of distributed control devices via the communication path; means for rearranging plant information sent from each distributed control device, based on the time information added to the plant information; means for accumulating the rearranged plant information using as a rearrangement key the time information added to the plant information; and means for sending out the accumulated information to other supervisory devices or other distributed control devices.

20. A decentralized supervisory control system according to claim 12, wherein said distributed control device comprises access management means for limiting accesses from said supervisory device via said communication means during maintenance of said supervisory control means via a maintenance terminal.

21. A decentralized supervisory control system according to claim 12, wherein a said distributed control device comprises means for registering a telephone number for use in accessing the distributed control device, means for retrieving a calling telephone number, and network security means for comparing the registered telephone number with the calling telephone number.

22. A decentralized supervisory control system according to claim 12, wherein said distributed control device comprises automatic alarm means operating when an event results from a process executed by said supervisory control means on the controller PIO data or sensor information input by the controller or sensor via the I/O interface, to automatically notify said supervisory device of the event.

23. A decentralized supervisory control system according to claim 12, wherein said distributed control device comprises diagnostic means for periodically receiving the PIO data from said controller as well as the sensor information, checking whether or not said controller and said sensor are operating correctly based on the received data, allowing decentralized controlled devices within a same group to communicate periodically and mutually to check whether or not they are operating correctly, and communicating check results to said supervisory device.

* * * * *